UNITED STATES PATENT OFFICE.

BERNHARD DEICKE, OF HÖCHST-ON-THE-MAIN, GERMANY, ASSIGNOR TO THE FARBWERKE, VORMALS MEISTER, LUCIUS & BRÜNING, OF SAME PLACE.

RED ACID DYE AND PROCESS OF MAKING IT.

SPECIFICATION forming part of Letters Patent No. 610,345, dated September 6, 1898.

Application filed November 5, 1897. Serial No. 657,538. (No specimens.)

*To all whom it may concern:*

Be it known that I, BERNHARD DEICKE, doctor of philosophy, a citizen of the German Empire, residing at Höchst-on-the-Main, Germany, have invented certain new and useful Improvements in the Manufacture of Basic Disazo and Polyazo Dyestuffs, of which the following is a specification.

This invention relates to the production of disazo and polyazo dyestuffs.

I have found that amidobenzylamin and its derivatives alkylated in the benzylamin radical, the salts of which are expressed by the general formula

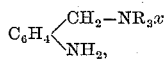

in which R represents hydrogen or an alkyl and $x$ an acid radical, may be employed for the manufacture of basic disazo and polyazo dyestuffs having the valuable property of dyeing cotton and wool simultaneously in an acid-bath.

The process consists in diazotizing this amidobenzylamin or the said alkyl derivatives and combining it with a primary aromatic amin, then rediazotizing and combining with an aromatic amin, phenol, amido or oxyazo dyestuff.

The general formula of the dyestuffs to be obtained according to this process is the following:

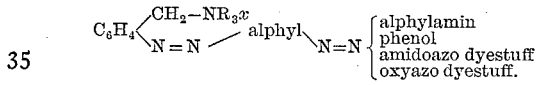

Under "alphylamin" and "alphyl" are understood, as is known, aromatic amins, (also diamins,) respectively the radicals in such amins. As phenols are likewise to be considered pyrazolons, which exhibit the general properties of phenols.

Example: One hundred parts, by weight, of the zinc-chlorid double salt of paramidobenzyldiethylamin are dissolved in water with forty parts, by weight, of concentrated hydrochloric acid and diazotized with 17.8 parts, by weight, of nitrite. The diazo solution is added to the solution of 27.6 parts, by weight, of meta-toluidin, twenty-six parts, by weight, of concentrated hydrochloric acid, and ninety parts, by weight, of sodium acetate. After some hours the whole is boiled, and to the well-cooled solution are added sixty-six parts, by weight, of concentrated hydrochloric acid and further diazotized with 17.8 parts, by weight, of nitrite. The solution thus resulting is added to an aqueous solution of 37.2 parts, by weight, of beta-naphthol in one hundred and four parts, by weight, of caustic-soda lye of 40° Baumé. After several hours standing it is again boiled, acidified, and the dyestuff separated by means of common salt.

The dyestuff is easily soluble in water and alcohol with a red color, little soluble in ether, benzene, and ligroin.

Having thus described my invention, what I claim is—

1. The process herein described of producing azo dyestuffs, of the general formula:

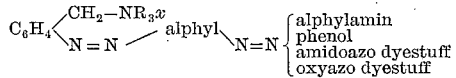

which consists in diazotizing amidobenzylamin and its alkyl derivatives, the salts of which are expressed by the general formula:

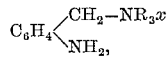

and combining with a primary aromatic amin, then rediazotizing and combining with an aromatic amin, phenol, (pyrazolon,) amido or oxyazo dyestuff, substantially as set forth.

2. As a new product, the dyestuff derived from paramidobenzyldiethylamin, being a dark powder of greenish luster, soluble in water and alcohol with a red color, almost insoluble in ether, benzene and ligroin, and dyeing half-wool red in an acid-bath, substantially as set forth.

In testimony that I claim the foregoing as my invention I have signed my name in presence of two subscribing witnesses.

BERNHARD DEICKE.

Witnesses:
HEINRICH HAHN,
ALFRED BRISBOIS.